United States Patent [19]
Albright

[11] Patent Number: 5,855,123
[45] Date of Patent: Jan. 5, 1999

[54] KNITTED TEXTILE FABRIC HAVING INTEGRAL SEAMLESS ELASTICATED CONTOURS, PANTY BLANK FORMED THEREOF, AND FABRICATING A PANTY GARMENT THEREFROM

[75] Inventor: David Albright, Rockingham, N.C.

[73] Assignee: The Russell Group, Ltd., Rockingham, N.C.

[21] Appl. No.: 811,894

[22] Filed: Mar. 5, 1997

Related U.S. Application Data

[60] Provisional application No. 60/013,656, Mar. 19, 1996.
[51] Int. Cl.$^6$ ...................................................... A41B 9/00
[52] U.S. Cl. .............................................. 66/177; 66/202
[58] Field of Search ............................ 66/172 R, 172 E, 66/175, 177, 178 R, 178 A, 64, 51, 171; 2/78.1, 78.3, 73, 76, 400, 401, 404, 407

[56] References Cited

U.S. PATENT DOCUMENTS

| | | |
|---|---|---|
| D. 352,812 | 11/1994 | Van Laar . |
| 3,985,004 | 10/1976 | Johnson et al. . |
| 4,048,819 | 9/1977 | Johnson . |
| 4,527,403 | 7/1985 | Fullbright et al. . |
| 4,663,946 | 5/1987 | Wright . |
| 4,722,202 | 2/1988 | Imboden ................................. 66/177 |
| 4,887,439 | 12/1989 | Teconi ..................................... 66/51 |
| 5,181,278 | 1/1993 | Peleg et al. ............................ 2/243 R |
| 5,210,882 | 5/1993 | Moretz et al. . |
| 5,217,782 | 6/1993 | Moretz et al. . |
| 5,249,320 | 10/1993 | Moretz et al. . |
| 5,269,720 | 12/1993 | Moretz et al. . |
| 5,291,617 | 3/1994 | Moretz et al. . |
| 5,297,296 | 3/1994 | Moretz et al. . |
| 5,306,536 | 4/1994 | Moretz et al. . |
| 5,315,717 | 5/1994 | Moretz et al. . |
| 5,319,807 | 6/1994 | Brier . |
| 5,353,524 | 10/1994 | Brier . |
| 5,377,507 | 1/1995 | Shima ....................................... 66/69 |
| 5,385,502 | 1/1995 | Moretz et al.. . |
| 5,392,467 | 2/1995 | Moretz et al. . |
| 5,414,870 | 5/1995 | Moretz et al. . |
| 5,435,014 | 7/1995 | Moretz et al. . |
| 5,441,436 | 8/1995 | Moretz et el. . |
| 5,471,683 | 12/1995 | Moretz et al. . |
| 5,479,791 | 1/1996 | Osborne . |

*Primary Examiner*—Michael A. Neas
*Assistant Examiner*—Larry D. Worrel, Jr.
*Attorney, Agent, or Firm*—Kennedy Covington Lobdell & Hickman, LLP

[57] ABSTRACT

Narrow contoured portions of a circularly knitted textile fabric may be elasticated by the selective insertion of elastic yarn segments in selected wales and courses defining the contoured area to be elasticated, preferably utilizing a circular knitting machine equipped with a computerized electronic needle selection system. In one application, a panty blank may be formed with curved elasticated contours to define leg opening borders whereby disposable or limited use garments may be fabricated with elasticized leg openings without the laborious sewing of narrow elastic bands along the leg openings. In such garments, an elasticated contour may also be fashioned to define a retaining crotch pocket for a menstrual or incontinent pad.

30 Claims, 6 Drawing Sheets

KNITTED TEXTILE FABRIC HAVING INTEGRAL SEAMLESS ELASTICATED CONTOURS, PANTY BLANK FORMED THEREOF, AND FABRICATING A PANTY GARMENT THEREFROM

CROSS-REFERENCE TO RELATED APPLICATION

This disclosure incorporates and has the priority of U.S. Provisional Patent Application Ser. No. 60/013,656, filed Mar. 19, 1996, entitled PANTY-TYPE GARMENT WITH ELASTICIZED LEG OPENINGS FORMED WITH ELASTIC YARN INSERTED DURING THE KNITTING PROCESS.

BACKGROUND OF THE INVENTION

It is known to make a panty article by initially knitting a tubular panty blank on a circular knitting machine, slitting the tubular blank lengthwise along a line formed in the knitting process, cutting away excess fabric from the areas which will form leg openings, folding the blank lengthwise to bring together the raw edges formed by slitting, and then sewing the raw edges together at opposite sides to complete the panty. The blank, as it comes off the knitting machine, is preferably of an hourglass configuration resulting from the knitting of a lengthwise region approximately midway between the opposite ends of the blank in a mock rib construction causing this region to have a lesser diameter than the end regions of the blank. Thus, when the blank is slit, cut, and sewn, the mock rib region forms the crotch area of the resultant panty. Representative patents disclosing this methodology are U.S. Pat. Nos. 3,985,004; 4,048,819; and 4,663,946. U.S. Pat. No. 4,527,403 discloses another somewhat related type of panty garment.

However, it has not heretofore been possible to incorporate elastic into the knitted blank in the area bordering the leg openings so as to create elasticized leg openings in the panty ultimately formed. Instead, the conventional means of elasticating the leg openings is to sew a narrow width elastic band along the perimeter of each leg opening to provide a finished and elasticated edge. One of the disadvantages of this conventional procedure is the additional material and labor expense in sewing on the elastic band.

SUMMARY OF THE INVENTION

It is accordingly an object of the present invention to overcome the above-described shortcomings of the current state of the art so as to simplify and reduce the expense of fabricating panty-type garments. More particularly, it is an object of the present invention to provide for the novel formation of integral seamless elasticated contours in knitted textile fabrics, especially circularly knitted fabrics, to enable the selective formation of such elasticated contours of various and sundry configurations and dispositions within a knitted fabric, thereby permitting among other things the knitting of a novel panty blank wherein such integral seamless elasticated contours will define elasticated borders for leg openings in a panty fabricated therefrom. A further object of the present invention is to provide a novel process for fabricating a panty garment utilizing the fabric and panty blank of the present invention. A more specific object of the present invention is to accomplish the simplified and inexpensive fabrication of panty garments suitable to be disposable after a single or limited number of uses. For example, an object in one embodiment of the present invention is to provide a panty garment with an additional elasticated contour defining a pocket to receive a menstrual pad or the like. Other objects and advantages of the present invention will be apparent from the disclosure of the present invention set forth hereinafter.

Basically, the knitted textile fabric of the present invention comprises a body yarn formed in stitch loops aligned with one another in courses extending transversely of the fabric and in wales extending longitudinally of the fabric. According to the present invention, segments of an elastic yarn are formed with the body yarn in selected wales of selected courses, with the elastic yarn segments causing the fabric of the body yarn to constrict at the selected wales and selected courses. The selected wales and courses are located in relation to one another to collectively define an elasticated contour extending longitudinally and transversely with respect to the fabric of the body yarn.

Preferably, the fabric of the present invention is formed by circular knitting, whereby the stitch loops of the body yarn extend in circumferential courses and are interlooped in axially aligned wales. The elastic yarn segments preferably are formed in stitch loops disposed in plated relation with the stitch loops of the body yarn. In order to cause the elasticated contour formed by the elastic yarn segments to extend both longitudinally and transversely relative to the body yarn fabric, the selected wales in which the elastic yarn segments are formed differ in at least some of the selected courses, preferably so as to cause the elasticated contour to extend in an arcuate curvature longitudinally across a plurality of adjacent courses of the body yarn and transversely across a plurality of adjacent wales of the body yarn.

The knitted panty blank of the present invention basically comprises a front panel to overlie the abdomen of a wearer, a rear panel to overlie the hips and buttocks of the wearer, a constricted crotch panel connected to at least one of the front and rear panels to overlie the wearer's crotch area, and opposed arcuately curved elasticated contours which extend respectively along and are knitted seamlessly with opposite sides of the front, rear and crotch panels to define elasticated borders of leg openings. The knitted panty blank is formed of a knitted textile fabric as described above wherein a body yarn is formed in stitch loops aligned with one another in courses extending transversely of the panels and the elasticated contours and in wales extending longitudinally of the panels and the contours, and elastic yarn segments are formed with the body yarn in the stitch loops of the elasticated contours to elasticize the leg opening borders as an integral seamless element of the fabric blank. Various embodiments of knitted panty blanks having these salient characteristics are contemplated and, in many of such embodiments, the blank will include connecting panels of fabric defined within the elasticated contours to facilitate knitting of the blank but which connecting panels will be cut and discarded during subsequent fabrication of the blank into a panty garment.

Thus, the present invention further provides a novel process of fabricating panty garments utilizing panty blanks having the basic characteristics described above. Essentially, following knitting of the panty blank, the connecting portions disposed within the elasticated contours are cut and removed from the blank to form leg openings bordered by the elasticated contours.

In one embodiment, the panty blank is circularly knitted as a seamlessly knitted fabric tube wherein the front panel and the rear panel are spaced axially with the crotch panel extending axially therebetween and the elasticated contours are aligned with one another in the tube to define connecting panels therewithin as an axially symmetrical oval fabric region circumferentially opposite the crotch panel. Utilizing such blank, the process of fabricating a panty garment is carried out by initially slitting the fabric tube axially along a line bisecting the oval fabric region to separate the elasticated contours and the connecting panels and to form respective side margins of the front and rear panels. Thereafter, the connecting panels are cut and removed from the blank and the respective side margins of the front and rear panels are joined to one another, e.g., by sewing, to complete the panty garment. Such tubular panty blanks may be conveniently made on many conventional small diameter hosiery knitting machines, in which case a single panty blank may be knitted as a single fabric tube. Alternatively, by utilizing larger diameter circular knitting machines, multiple panty blanks of the described construction could be made axially side by side as part of a single seamless knitted tube. In such case, the panty blanks would be separated from one another by slitting the tube at multiple axial locations to separate the individual blanks from one another.

In an alternative embodiment, the panty blank may be circularly knitted as a seamless fabric tube wherein the front panel and the rear panel are seamlessly joined circumferentially at opposite sides of the tube, with the crotch panel formed as a first crotch portion knitted axially to the front panel and a second crotch portion knitted axially to the rear panel, and the elasticated contours and the connecting panels defined therewithin are formed circumferentially between the first and second crotch portions and axially adjacent the joinder of the front and rear panels at the opposite sides of the tube. Utilizing this embodiment of the knitted panty blank, the process of fabricating a panty garment is carried out by simply cutting and removing the connecting panels along the bordering elasticated contours and then joining the first and second crotch portions, e.g., by sewing, to complete the panty garment.

Preferably, the panty blank is knitted or otherwise formed to include at least one welt edge in each embodiment bordering the front and rear panels to form a waistband in the resultant panty garment. The panty blank may also be formed with a second elasticated contour disposed adjacent and substantially surrounding the crotch panel to define a pocket area for receiving and retaining a device for absorbing bodily fluids of the wearer, e.g., a menstrual or incontinent pad.

The present invention preferably utilizes a circular knitting machine with a computerized electronic needle selection system such as manufactured under the brand name "Lonati" by Santoni SRL, an Italian knitting machine manufacturer located in Brescia, Italy. The electronic needle selection system of such machines conveniently enables greatly expanded needle selection and patterning capabilities and flexibility over conventional mechanical needle selecting devices, thereby facilitating the knitting of a fabric with a narrow contoured region of elastic yarn, e.g., a panty blank as described above with elasticated contours along the portion of the blank bordering the fabric portions which will be later cut away to form leg openings. Hence, in the hourglass-type blank described above, the contoured elastic regions essentially define an oval shape oriented lengthwise of the blank at the side of the blank opposite the ribbed crotch portion. As described, to fabricate the panty, the blank is simply slit lengthwise and the fabric within the elasticated oval region is cut away and disposed of. After folding and sewing of the side edges of the blank together, the elasticated region is left bordering the two leg openings and the opposite sides of the crotch.

Preferably, the elasticated contour in each embodiment occupies only a few (e.g., twenty) wales of each fabric course, but to produce the contour necessary and desirable to conform to the normal contour of panty leg openings, the actual wales in which the elastic yarn is inserted shifts progressively from course to course to achieve the appropriate contour. The computerized needle selection capability of the "Lonati" machine is particularly advantageous to achieve this result. By use of such machine, the elastic yarn can be selectively inserted at a given feed of the machine to only the few needles necessary to receive the elastic yarn, and then during subsequent courses, different needles can be selected to receive the elastic yarn so as to produce a continuous yet contoured narrow oval-shaped elastic region. In each wale in which the elastic yarn appears, the elastic yarn is plated with the main body yarn of the blank.

DETAILED DESCRIPTION OF THE PREFERRED EMBODIMENTS

Figure 1:
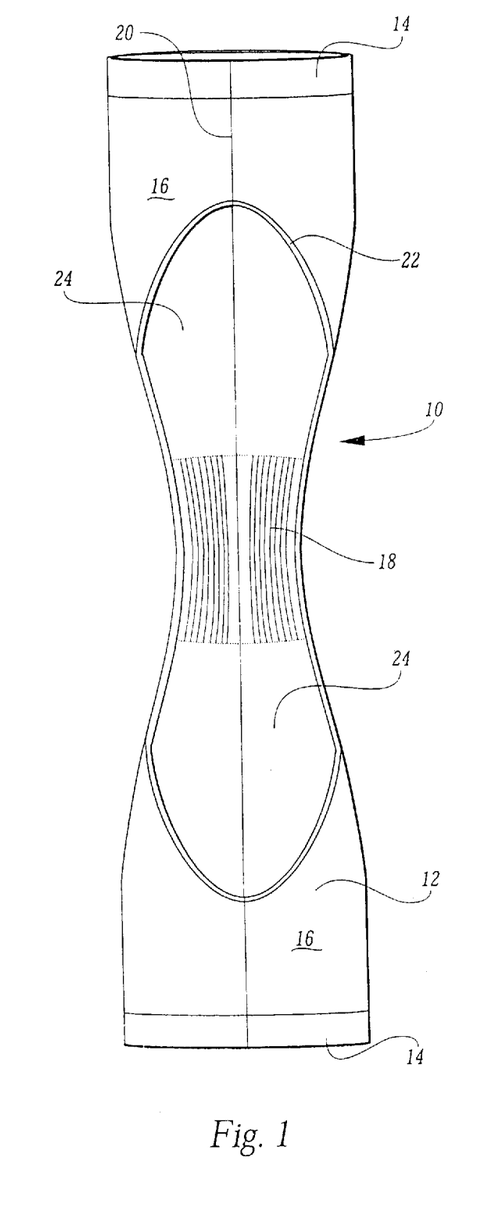
FIG. 1 is a perspective view of a panty blank in accordance with one embodiment of the present invention wherein the blank is circularly knitted as a seamless tube of fabric, the blank being depicted in FIG. 1 in the form as removed from the knitting machine prior to any subsequent processing.
Figure 2:
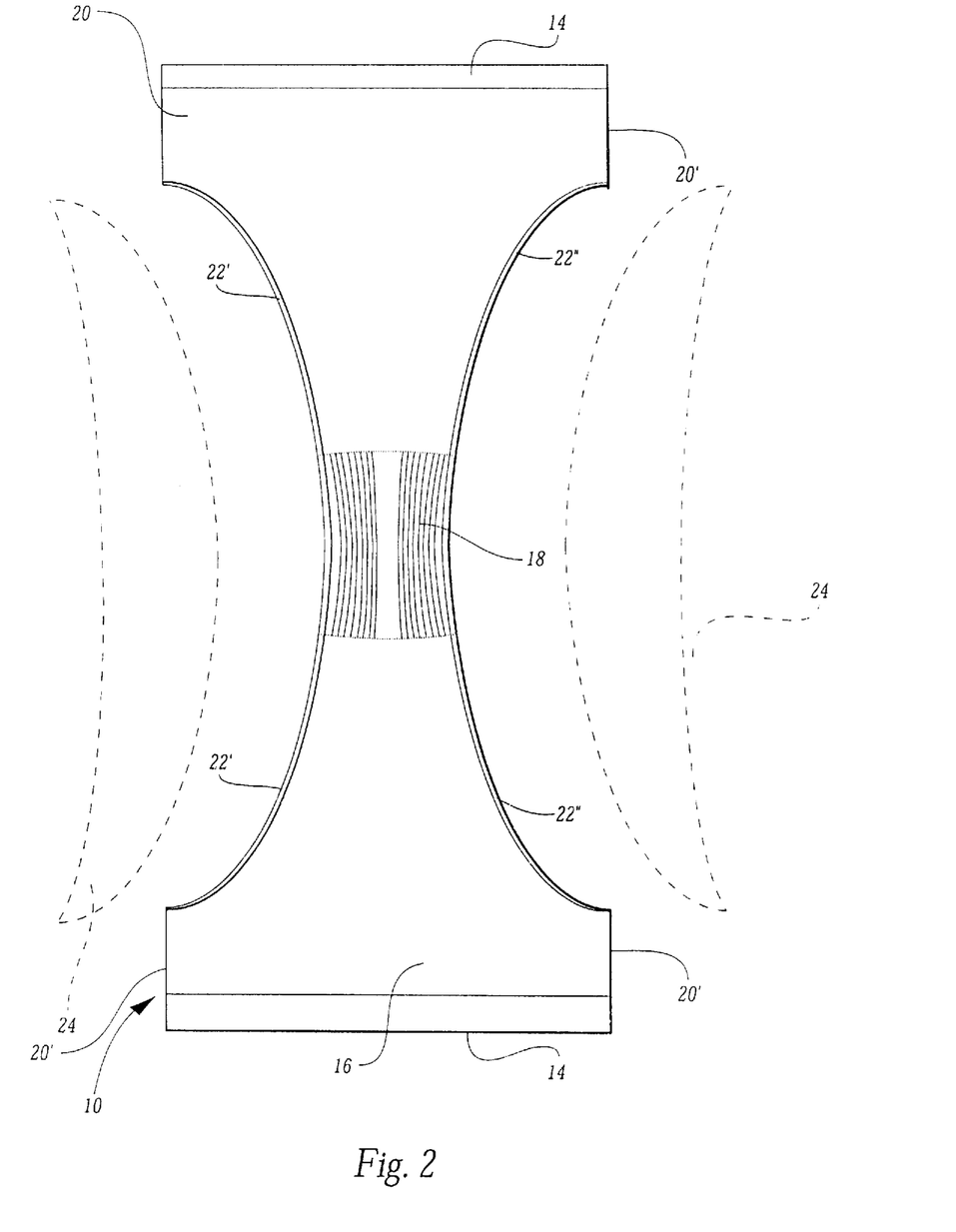
FIG. 2 is an elevational view of the blank of FIG. 1 after having been slit longitudinally and the connecting portions of the blank having been cut and removed.
Figure 3:
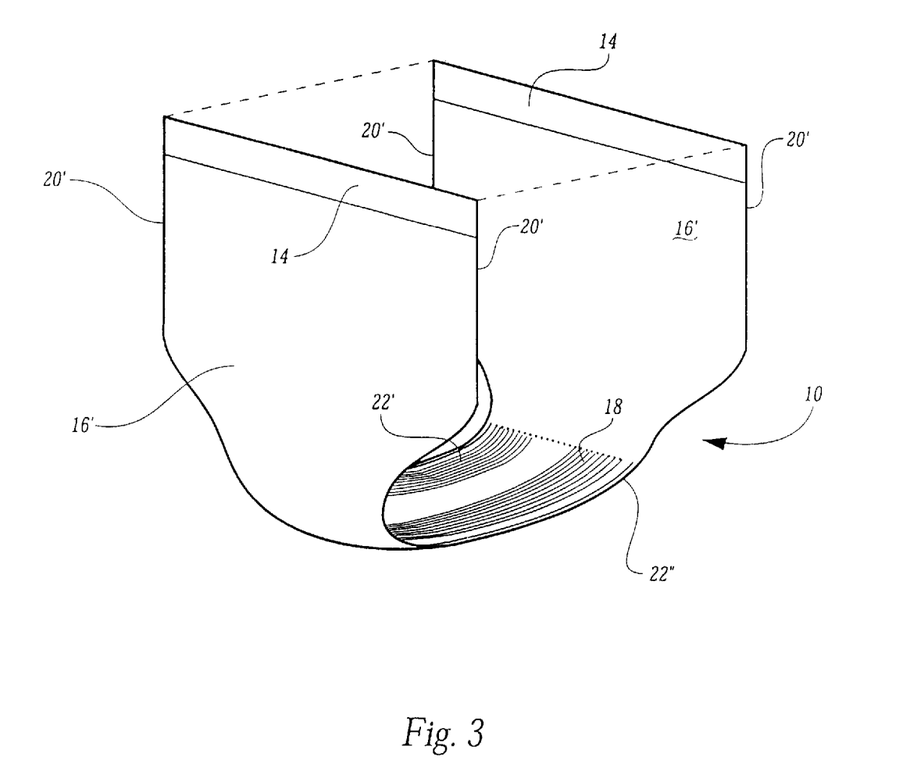
FIG. 3 is a perspective view depicting the slit and cut fabric blank of FIG. 2 in the process of being folded and sewn into a finished panty garment.

Referring now to the accompanying drawings and initially to FIGS. 1–3, FIG. 1 is a perspective view basically showing one embodiment of a panty blank 10 according to the present invention as the blank comes off a hosiery-type small-diameter circular knitting machine such as the "Lonati" machine described above. Overall, the blank is formed as a seamless circularly knitted tube 12 having annular turned welts 14 at each opposite end of the tube 12 forming finished end edges of the tube and an elongate lengthwise tubular knitted fabric body 16 extending axially between the welts 14, with an annular region of the fabric body 16 approximately midway between the welts 14 being formed of a mock-rib construction as indicated at 18 causing the ribbed area 18 to be of a reduced diameter in comparison to the remainder of the body fabric 16 whereby the overall fabric tube 12 is formed into an hourglass shape. In the knitting process, several needles are utilized during each revolution of the knitting machine to form a visible axial line 20 lengthwise along the tube 12 to define a guide line along which the tube will be subsequently slit lengthwise. An oval elastic contoured region in which segments of an elastic yarn are selectively incorporated into a few wales of the body fabric is indicated at 22. As shown, the oval contoured region 22 of inserted elastic yarn segments is formed symmetrically about the slit line 20 and extends lengthwise beyond the opposite axial ends of the mock rib area 18.

Hence, following completion of the knitting of the fabric tube 12 shown in FIG. 1, the tube 12 can be slit axially along the guide line 20, thereby separating the oval contoured region of elastic yarn into two curved mirror-image elasticated contours 22',22", and the thusly slit fabric can be opened into a flattened condition wherein the connecting fabric portions 24 previously defined within the oval elasticated contours 22',22" can be severed and discarded. FIG. 2 illustrates the blank 10 in such opened condition after having been slit lengthwise along the line 20 producing raw slit edges 20' and the connecting fabric portions 24 within the elasticated contours 22',22" having been cut away and discarded. FIG. 3 depicts the step of folding the thusly slit, cut, and opened blank preparatory to sewing together of the raw slit edges 20', to produce a finished panty garment. As will be recognized, the welts 14 at the opposite ends of the panty blank 10 are aligned end to end to form a continuous waistband for the panty garment. The fabric body portions 16',16" originally spaced axially apart by the axially intervening mock rib area 18 become front and back panels of the panty garment for respectively overlying the abdomen and buttocks of a wearer, while the intermediate mock rib area 18 becomes a crotch panel in the garment for overlying the crotch of the wearer. The respective axial ends of each elasticated contour 22',22" are brought into abutment to form continuous elasticated borders defining leg openings at opposite sides of the crotch panel 18.

The infinitely variable needle selection capabilities of the Lonati circular knitting machine (or any equivalent machine similarly having electronic programmable computer-controlled individual needle selection capabilities) enable differing variations in the particular knitted stitch construction of the fabric body 16 so as to knit the oval elastic contours 22. By way of example, but without limitation, one acceptable stitch pattern provides a four course repeat wherein the elastic yarn segments will be selectively inserted to only selected wales in only alternate courses of the knitted fabric over the course of knitting the central length of the fabric tube 12 over which the oval elasticated contours 22 extend, so as to thereby form the oval shape of the elasticated contours.

Figure 6:
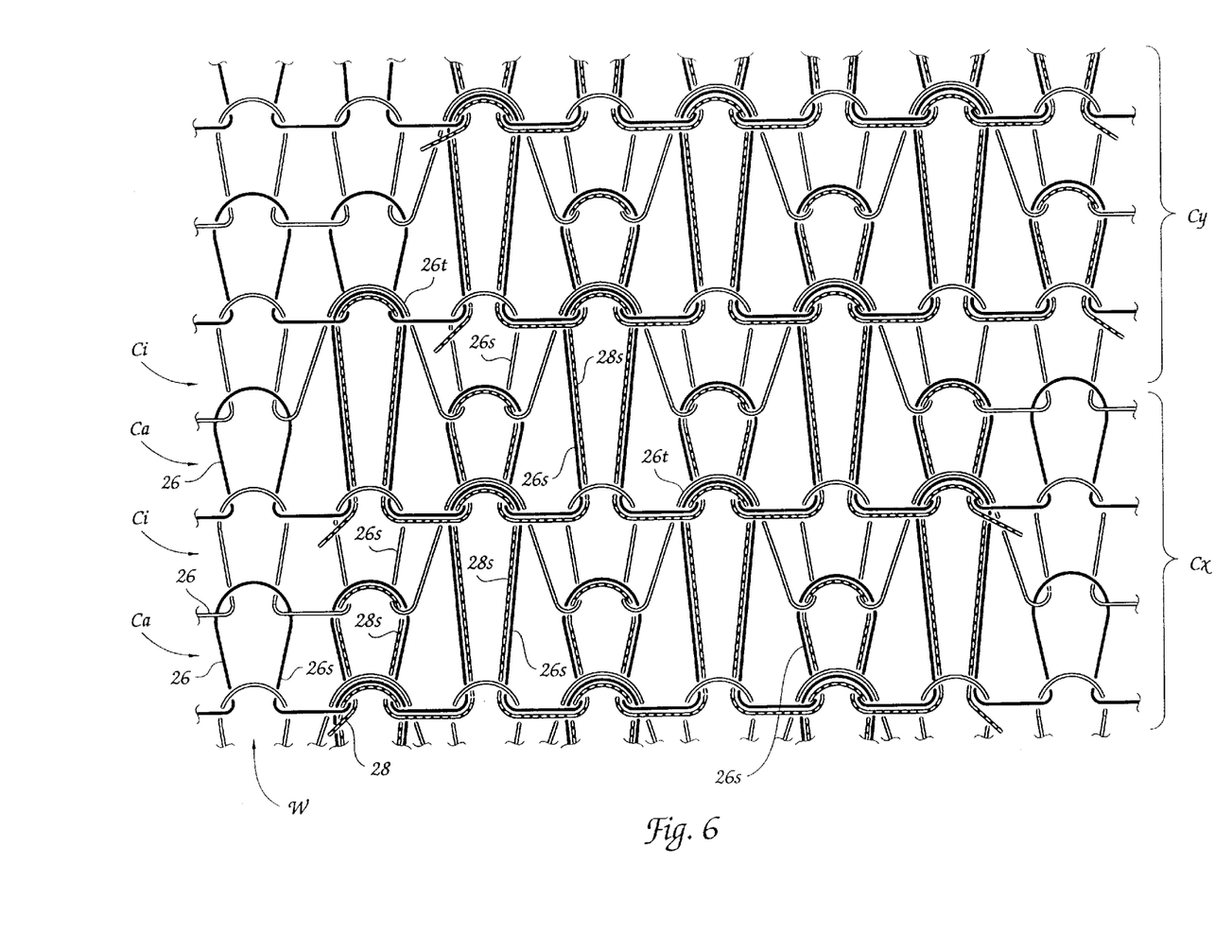
FIG. 6 is a diagrammatic elevational view representative of the knitted structure of the elasticated contours in the panty blanks of FIGS. 1–5.

Specifically, as depicted in FIG. 6, in knitting this region of the fabric body 16, alternate courses Ca will be of a plain jersey-knit construction in which a body yarn 26 is knit on every needle to appear in a full knitted stitch 26s in every fabric wale W. In such courses Ca, the elastic yarn 28 will be selectively inserted to only selected needles so as to appear in plain knitted stitches 28s in plated relation with the body yarn 26 in only such wales W of the fabric as necessary to incorporate the elastic yarn 28 in the oval elasticated contours 22. Thus, the needles selected to receive the plated elastic yarn 28 will change over the course of the knitting of the central lengthwise section of the fabric so as to form the elasticated contours 22 into the oval shape as indicated in FIG. 1. For example, in FIG. 6, the insertion of the elastic yarn 28 shifts one wale between courses Cx and Cy, although it will be understood that a greater walewise shift in the insertion of the elastic yarn 28 may be utilized depending upon the particular contour to be created. It should also be noted that, while as indicated above the walewise extent of the elasticated contours 22 wherein the elastic yarn 28 is inserted may span approximately twenty wales (or such other number of wales as may be necessary or desirable to accomplish a desired contour), the elastic yarn 28 is illustrated in FIG. 6 to span only six wales for sake of simplicity in the illustration of the knitted structure of the invention. During the knitting of this section of the fabric, the intervening courses Ci contain only the body yarn 26 knitted in plain jersey construction throughout each course Ci except in the elasticated contours 22 wherein the body yarn 26 is knitted in complete knitted stitches 26s on only alternating needles and formed in tuck stitches 26t on the intervening needles. From one intervening course Ci to the next intervening course Ci, the knitting and tucking of the body yarn 26 is reversed so as to be knitted on the intervening needles and tucked on the alternating needles.

Of course, the present invention is not restricted to this particular stitch pattern. Many various other stitch patterns could be utilized, provided that the elastic yarn 28 is selectively inserted into at least selected wales and selected courses so as to form the oval shape of the contoured regions 22 to be elasticated.

The possibility is also contemplated of utilizing dial-mounted cutting elements or otherwise incorporating a cutting element or mechanism into the knitting machine so as to cut away the body fabric within the elasticated oval contours 22 while the process of knitting the blank 10 is under way on the knitting machine, which would provide the additional advantage of eliminating the manual step of cutting away this portion of the blank's fabric. Then, the only steps necessary to form the blank into a finished panty would be to slit the blank lengthwise above and below the cutaway oval area and then fold and sew together the raw slit edges.

Figure 4A:
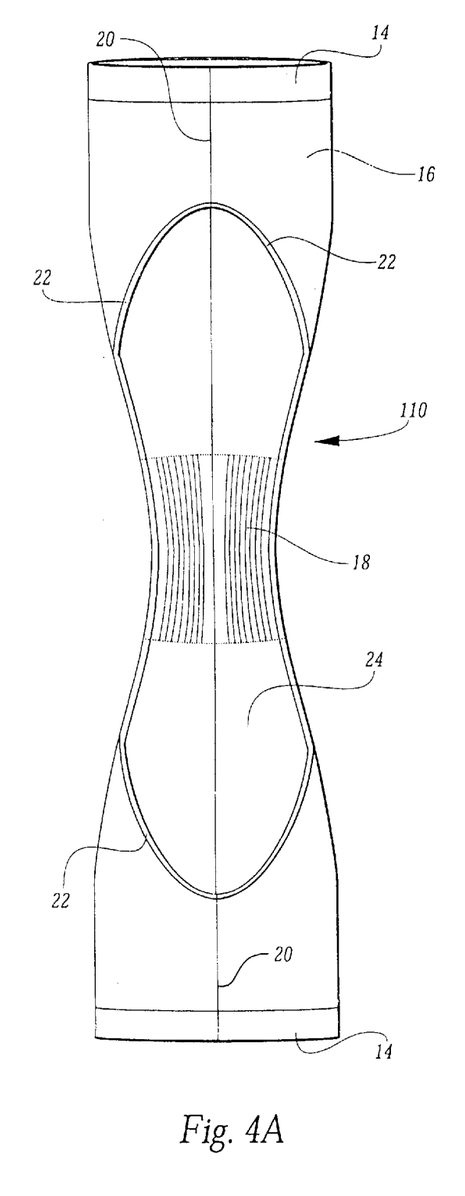
FIGS. 4A and 4B, respectively, are perspective views depicting opposite sides of another panty blank according to a second embodiment of the present invention, also formed by circular knitting as a seamless tube of fabric.
Figure 4B:
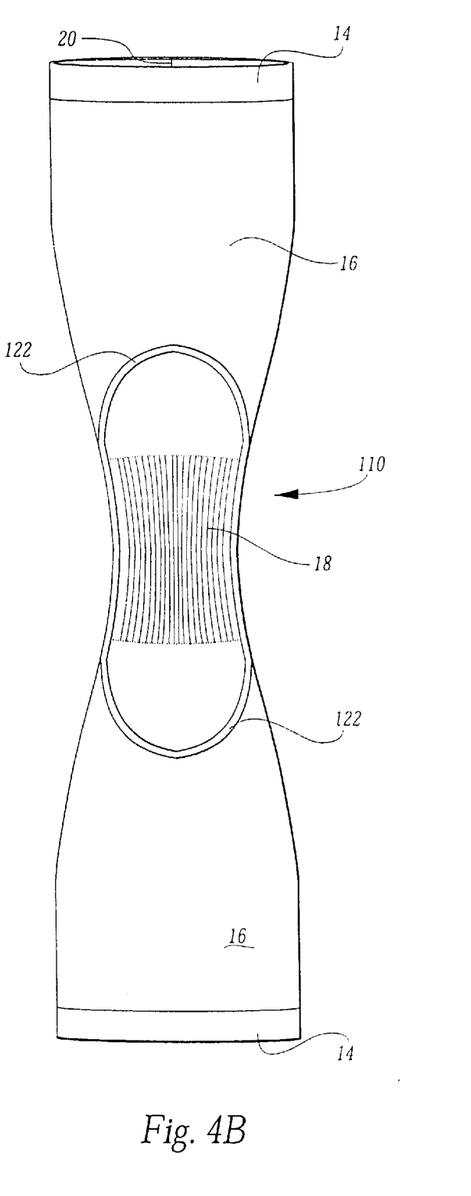

In an alternative embodiment, a second oval-shaped elasticized contour may be knitted in the same manner as described above at the same side of the blank as, and essentially encircling or surrounding, the mock rib crotch area. FIGS. 4A and 4B depict the opposite sides of a blank 110 in accordance with this embodiment of the invention, like reference characters indicating corresponding portions of the blank, with the second elasticated oval contoured region being indicated at 122. To fashion a panty garment from this blank, the blank is slit lengthwise along the line 20, the fabric 24 within the primary oval elasticated contours 22 is cut away, and the remaining fabric is opened, folded, and the raw slit edges sewn together, just as described above with respect to the first embodiment of FIGS. 1–3. As will be seen, the second oval-shaped elasticized contour 122 remains in the garment and encircles the crotch of the panty. Because the elastic yarn in the second oval-shaped elasticized contour 122 inherently causes the fabric to constrict along the perimeter of the oval, the oval elastic contour 122 effectively defines the border of a pocket region which will be effective for holding a sanitary napkin, incontinent pad, or the like against undesired shifting during normal wearing of the garment. As will be understood, therefore, the second elasticized contour 122 will preferably be configured and dimensioned precisely to fit the size and shape of whatever pad is intended to be used in the garment. Typically, the second oval elasticized contour 122 will be smaller than the primary oval elastic contour 22.

In such embodiment, it may be desirable to form the crotch area 18 and adjacent portions of the front and back panels 16',16" of a knitted structure having a reduced walewise stretchability in comparison to the plain jersey construction of the remainder of the fabric body 16, so as to assist in urging the crotch panel of the panty and the pad retained therein securely against the wearer's body. To enhance this effect and to assist in minimizing undesirable leakage of body fluids from the garment and the pad, the portions of the fabric body 16 bordering the elasticated contours 22 may similarly have a stitch construction providing reduced walewise stretchability. For example and without limitation, the portions of the fabric body 16 intended to have restricted walewise stretchability may be formed of a knit-tuck stitch construction wherein full knit stitches and tuck stitches alternate wale to wale in each course and reverse alternation from course to course, in similar manner to that of the intervening courses Ci within the elasticated contours 22, as described above with regard to FIG. 6. As will be understood, the tuck stitches in such construction provide a simple means of restricting the walewise stretchability of the fabric body 16 within the regions of the fabric body 16 so knitted, but of course persons skilled in the art will recognize that other stitch patterns can be equally well employed to accomplish the same basic purpose and function within the resultant garment.

Figure 5:
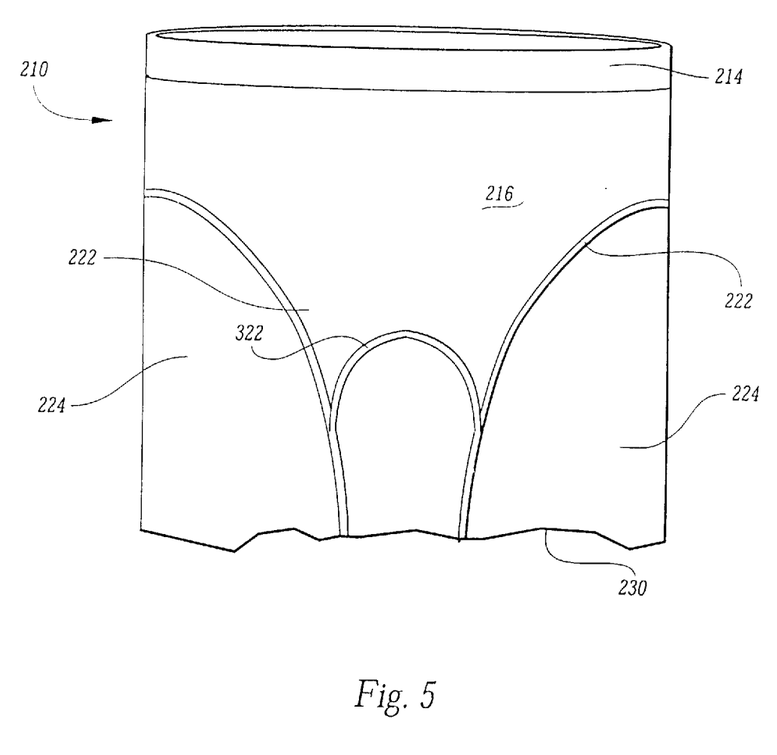
FIG. 5 is a perspective view of a further panty blank according to a third embodiment of the present invention, also made by circular knitting as a seamless fabric tube.

In accordance with a third embodiment of the invention, a seamless panty or brief garment can be fabricated, as illustrated in FIG. 5. Under this embodiment, a blank 210 is knitted on the knitting machine in a diameter consistent with the desired waist size and hip size of the panty/brief garment to be fabricated. The top of the blank is formed with a turned welt 214 in conventional fashion, but the bottom end of the blank will have a raw edge 230. At the left and right sides of the tubular blank, elasticized contours 222 are formed by the same process described above but in mirror-image half-oval shape rather than in the shape of a full closed oval. To convert the blank into a garment, the portions 224 of the fabric body 216 at the bottom of the blank within the two left and right side half-oval elasticized contours 222 are cut away and disposed of. The raw bottom edge of the blank 210 left remaining at the front and back of the garment is then sewn together to complete the crotch. Notably, no seam results at either the left or right sides of the finished garment, whereby the front and back panels of the panty are seamlessly connected circumferentially at opposite sides of the panty. It is additionally possible in this embodiment to provide an elastic bordered pad-retaining pocket by knitting elasticized half-oval regions 322 joined to the lower ends of the front and back panels of the blank to define front and back crotch portions of the main fabric body which will be seamed together to form the crotch panel of the garment.

A significant advantage of the three embodiments of the invention described above is that a panty garment can be made very inexpensively with a minimum of labor expense. Taking advantage of the computerized needle selection capabilities of the Lonati machine, the computer program controlling the knitting operation can be quickly changed to alter any feature of the panty blank, e.g., the overall size of the blank, the size of the leg openings, the contour of the elasticized borders of the leg openings, the presence or absence of the second oval-shaped elasticized contour, the size, shape, and contour of the pad-receiving pocket defined by the second oval-shaped elastic contour, etc. Advantageously, by saving the material and labor expense of sewing an elastic band about the leg openings in the panty garment of each embodiment, panty garments in accordance with the present invention can be fabricated inexpensively enough that the garments can be disposable after a single or limited number of uses, which will be particularly attractive and beneficial in embodiments designed for use as specialty menstrual or incontinent garments. Importantly, the elastic yarn incorporated into the elasticated contours bordering the leg openings naturally serves to constrict the fabric wales containing the elastic yarn and thereby inherently tends to resist unraveling of the fabric structure despite leaving the cut edges unseamed. The alternating knit-tuck structure of the body yarn in the courses intervening the elastic yarn courses throughout the elasticated contours further assists in resisting unraveling of the fabric.

Several possibilities are also contemplated for applying a moisture barrier to any of the described garments or otherwise imparting moisture impermeability to a selected region of the fabric of such garments, most typically the crotch region. As one alternative, a moisture impervious film may be bonded to the outer surface of the crotch region of the garment. A similar alternative involves applying a moisture resistant composition to the outer surface of the garment by a printing-type process carried out at low temperature in similar fashion to heat transfer printing, whereby the composition transfers to, and becomes bonded to, the outer surface of the garment by sublimation. The composition currently considered to be preferred is a composition which comprises Teflon as the moisture-resistant agent. A third concept is to sew into the inside of the crotch region of any such garment a moisture retaining pad. One such pad which has been shown in preliminary testing to provide good results is a quilted double knit fabric formed with hydrophobic yarns at the fabric face next to the body and hydrophilic yarns at the fabric face opposite the body so as to provide wicking of moisture and to promote a dry feel next to the body. A further possibility is to apply Teflon or another moisture-resistant composition to the yarns used in the knitting process, either during the original manufacture of the yarn or as a subsequent yarn finishing process.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A knitted textile fabric comprising a body yarn formed in jersey stitches aligned with one another in courses extending transversely of the fabric and in wales extending longitudinally of the fabric, and segments of an elastic yarn formed with the body yarn in selected wales of selected courses thereof, the elastic yarn segments causing the fabric of the body yarn to constrict at the selected wales and selected courses, the selected wales and selected courses being located in relation to one another for collectively defining an elasticated contour extending longitudinally and transversely with respect to the fabric of the body yarn, the selected courses comprising alternating courses of the body yarn and the selected wales in each selected course comprising a selected number of successive wales, the body yarn being formed in alternating jersey stitches and tucks in the courses of the body yarn intervening the alternating courses.

2. A knitted textile fabric according to claim 1, wherein the body yarn is circularly knitted with the jersey stitches extending in circumferential courses and interlooped in axially aligned wales.

3. A knitted textile fabric according to claim 1, wherein the elastic yarn segments include jersey stitches disposed in plated relation with jersey stitches of the body yarn.

4. A knitted textile fabric according to claim 1, wherein the selected wales in some of the selected courses differ from the selected wales in other of the selected courses.

5. A knitted textile fabric according to claim 1, wherein the elasticated contour extends in an arcuate curvature longitudinally across a plurality of adjacent courses of the body yarn and transversely across a plurality of adjacent wales of the body yarn.

6. A knitted blank for manufacture of a panty, comprising a front panel, a rear panel, a constricted crotch panel connected to at least one of the front and rear panels, and opposed arcuately curved elasticated contours extending respectively along and knitted seamlessly with opposite sides of the front, rear and crotch panels for defining elasticated borders of leg openings, the blank being formed of a knitted textile fabric comprising a body yarn formed in jersey stitches aligned with one another in courses extending transversely of the panels and the contours and in wales extending longitudinally of the panels and the contours, and segments of an elastic yarn formed with the body yarn in the jersey stitches in selected wales of selected courses of the elasticated contours to elasticize the leg opening borders as an integral seamless element of the blank fabric, the selected courses comprising alternating courses of the body yarn and the selected wales in each selected course comprising a selected number of successive wales, the body yarn being formed in alternating jersey stitches and tucks in the courses of the body yarn intervening the alternating courses.

7. A knitted blank according to claim 6, wherein the blank fabric is circularly knitted with the jersey stitches extending in circumferential courses and interlooped in axially aligned wales.

8. A knitted blank according to claim 7, wherein the blank comprises a seamlessly knitted fabric tube having the front panel and the rear panel spaced axially and the crotch panel extending axially therebetween.

9. A knitted blank according to claim 8, wherein the elasticated contours are aligned with one another in the seamlessly knitted tube to define therewithin an axially symmetrical oval fabric region circumferentially opposite the crotch panel.

10. A knitted blank according to claim 7, wherein the blank comprises a seamlessly knitted fabric tube having the front panel and the rear panel seamlessly joined circumferentially at opposite sides of the tube and the crotch panel comprising a first crotch portion knitted axially to the front panel and a second crotch portion knitted axially to the rear panel.

11. A knitted blank according to claim 10, wherein the elasticated contours and connecting panels are formed circumferentially between the first and second crotch portions and axially adjacent the joinder of the front and rear panels at said opposite sides of the tube.

12. A knitted blank according to claim 6, wherein the elasticated contours define therewithin a portion of the fabric to be cut and discarded from the blank.

13. A knitted blank according to claim 6 and further comprising at least one welt edge for forming a panty waistband.

14. A knitted blank according to claim 6 and further comprising a second elasticated contour disposed adjacent the crotch panel for defining a border portion to aid in retaining a device for absorbing bodily fluids of the wearer.

15. A knitted blank according to claim 14, wherein the second elasticated contour substantially surrounds the crotch panel for defining a pocket area for receiving the absorbing device.

16. A process of fabricating a panty garment comprising the steps of knitting a panty blank comprising a front panel, a rear panel, a constricted crotch panel connected to at least one of the front and rear panels, opposed arcuately curved elasticated contours extending respectively along and knitted seamlessly with opposite sides of the front, rear and crotch panels for defining leg opening borders, and connecting panels within the elasticated contours; and cutting and removing from the blank the connecting panels to form leg openings bordered by the elasticated contours.

17. A process of fabricating a panty garment according to claim 16, wherein the knitting of the panty blank comprises knitting a body yarn in jersey stitches aligned with one another in courses extending transversely of the panels and the contours and in wales extending longitudinally of the panels and the contours, and forming segments of an elastic yarn with the body yarn in the jersey stitches of the elasticated contours to elasticize the leg opening borders as an integral seamless element of the blank fabric.

18. A process of fabricating a panty garment according to claim 17, wherein the knitting of the panty blank comprises circularly knitting the body yarn to form the jersey stitches in circumferential courses and in axially aligned wales.

19. A process of fabricating a panty garment according to claim 18, wherein the knitting of the panty blank comprises circularly knitting a seamless knitted fabric tube having the front panel and the rear panel spaced axially and the crotch panel extending axially therebetween and having the elasticated contours aligned with one another to define the connecting panels therewithin as an axially symmetrical oval fabric region circumferentially opposite the crotch panel.

20. A process of fabricating a panty garment according to claim 19 and further comprising slitting the fabric tube axially along a line bisecting the oval fabric region to separate the elasticated contours and the connecting panels and to form respective side margins of the front and rear panels and, after cutting and removing the connecting panels, joining the respective side margins of the front and rear panels to complete the panty garment.

21. A process of fabricating a panty garment according to claim 18, wherein the knitting of the panty blank comprises circularly knitting a seamless knitted fabric tube having the front panel and the rear panel seamlessly joined circumferentially at opposite sides of the tube, the crotch panel comprising a first crotch portion knitted axially to the front panel and a second crotch portion knitted axially to the rear panel, and the elasticated contours and connecting panels formed circumferentially between the first and second crotch portions and axially adjacent the joinder of the front and rear panels at said opposite sides of the tube.

22. A process of fabricating a panty garment according to claim 21 and further comprising, after cutting and removing the connecting panels, joining the first and second crotch portions to complete the panty garment.

23. A process of fabricating a panty garment according to claim 18, wherein the knitting of the panty blank comprises circularly knitting at least one welt.

24. A process of fabricating a panty garment according to claim 16, wherein the knitting of the panty blank further comprises forming a second elasticated contour disposed adjacent the crotch panel for defining a border portion to aid in retaining a device for absorbing bodily fluids of the wearer.

25. A process of fabricating a panty garment according to claim 24, wherein the knitting of the panty blank further comprises forming the second elasticated contour substantially surrounding the crotch panel for defining a pocket area for receiving the absorbing device.

26. A knitted blank for manufacture of a panty, comprising a front panel, a rear panel, a constricted crotch panel connected to at least one of the front and rear panels, opposed arcuately curved elasticated contours extending respectively along and knitted seamlessly with opposite sides of the front, rear and crotch panels for defining elasticated borders of leg openings, and another elasticated contour disposed adjacent the crotch panel for defining an elasticated crotch border to aid in retaining a device for absorbing bodily fluids of the wearer, the blank being formed of a knitted textile fabric comprising a body yarn formed in jersey stitches aligned with one another in courses extending transversely of the panels and the contours and in wales extending longitudinally of the panels and the contours, and segments of an elastic yarn formed with the body yarn in the jersey stitches of the elasticated contours to elasticize the leg opening and crotch borders as integral seamless elements of the blank fabric.

27. A knitted blank according to claim 26, wherein the another elasticated contour substantially surrounds the crotch panel for defining a pocket area for receiving the absorbing device.

28. A process of fabricating a panty garment comprising the steps of knitting a panty blank comprising a front panel, a rear panel, a constricted crotch panel connected to at least one of the front and rear panels, opposed arcuately curved elasticated contours extending respectively along and knitted seamlessly with opposite sides of the front, rear and crotch panels for defining leg opening borders, another elasticated contour disposed adjacent the crotch panel for defining a border portion to aid in retaining a device for absorbing bodily fluids of the wearer, and connecting panels within the elasticated contours; and cutting and removing from the blank the connecting panels to form leg openings bordered by the elasticated contours.

29. A process of fabricating a panty garment according to claim 28, wherein the knitting of the panty blank further comprises forming the another elasticated contour substantially surrounding the crotch panel for defining a pocket area for receiving the absorbing device.

30. A process of fabricating a panty garment comprising the steps of knitting a panty blank comprising a front panel, a rear panel, a constricted crotch panel connected to at least one of the front and rear panels, opposed arcuately curved elasticated contours extending respectively along and knitted seamlessly with opposite sides of the front, rear and crotch panels for defining leg opening borders, and connecting panels within the elasticated contours; and cutting and removing from the blank the connecting panels to form leg openings bordered by the elasticated contours, wherein the knitting of the panty blank comprises knitting a body yarn in jersey stitches aligned with one another in courses extending transversely of the panels and the contours and in wales extending longitudinally of the panels and the contours, and forming segments of an elastic yarn with the body yarn in the jersey stitches in selected wales and selected courses of the elasticated contours to elasticize the leg opening borders as an integral seamless element of the blank fabric, the selected courses comprising alternating courses of the body yarn and the selected wales in each selected course comprising a selected number of successive wales, the body yarn being formed in alternating jersey stitches and tucks in the courses of the body yarn intervening the alternating courses.

* * * * *